(12) United States Patent
Takakuwa et al.

(10) Patent No.: US 6,667,381 B2
(45) Date of Patent: Dec. 23, 2003

(54) PROCESS FOR PRODUCING ALIPHATIC POLYESTER CARBONATE

(75) Inventors: Kyohei Takakuwa, Ibaraki (JP); Kunitoshi Mimura, Ibaraki (JP); Maki Ito, Ibaraki (JP); Noriko Dodo, Ibaraki (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 0 days.

(21) Appl. No.: 10/257,784

(22) PCT Filed: Apr. 16, 2001

(86) PCT No.: PCT/JP01/03233

§ 371 (c)(1),
(2), (4) Date: Oct. 17, 2002

(87) PCT Pub. No.: WO01/83581

PCT Pub. Date: Nov. 8, 2001

(65) Prior Publication Data

US 2003/0078364 A1 Apr. 24, 2003

(30) Foreign Application Priority Data

Apr. 21, 2000 (JP) ........................................ 2000-121523

(51) Int. Cl.$^7$ .............................................. C08G 64/00
(52) U.S. Cl. ........................................ 528/196; 528/198
(58) Field of Search .................................. 528/196, 198, 528/271, 272

(56) References Cited

U.S. PATENT DOCUMENTS 3,830,830 A   8/1974  Cleveland et al.

FOREIGN PATENT DOCUMENTS

| EP | 0 684 270 | 11/1995 |
| EP | 0 823 449 | 2/1998 |
| JP | 08-193125 | 7/1996 |
| JP | 11060709 A | 5/1999 |

OTHER PUBLICATIONS

Supplementary European International Search Report dated Apr. 1, 2003 for EP 01 91 9945.

*Primary Examiner*—Terressa M. Boykin
(74) *Attorney, Agent, or Firm*—Antonelli, Terry, Stout & Kraus, LLP

(57) ABSTRACT

In the process of the present invention for producing an aliphatic poly(ester carbonate), maleic anhydride, a $C_{2-20}$ glycol and hydrogen are reacted in the presence of a hydrogenating catalyst. By this process, an aliphatic poly(ester carbonate) having practically satisfactory moldability and physical properties is produced in a short period of time by a simplified method as compared to conventional production processes.

20 Claims, No Drawings

PROCESS FOR PRODUCING ALIPHATIC POLYESTER CARBONATE

TECHINICAL FIELD

The present invention relates to a process for producing a biodegradable aliphatic poly(ester carbonate) with high molecular weight, and more particularly to a simplified process for producing a biodegradable aliphatic poly(ester carbonate) with high molecular weight which is excellent in heat stability upon molding and suitable for preparation of various moldings and shaped articles such as films, sheets, filaments, injection-molded products and foam-molded products.

The aliphatic poly(ester carbonate) is excellent in fluidity and injection moldability, and suitable for obtaining moldings or shaped articles such as films, sheets, filaments and fibers. The resulting moldings or shaped articles have a sufficient mechanical strength and show a high biodegradability in soil or activated sludge process, and therefore, are extensively used for production of packaging materials and other moldings. Examples of these moldings or shaped articles include agricultural applications as mulching films covering the surface of soil for maintaining soil temperature, pots or strings for potted plants and coating materials for fertilizers; fishery applications as fishing lines and fishing nets; medical applications as medical materials; and hygienic applications as sanitary goods.

BACKGROUND ART

There is a recent demand for developing polymer materials which are decomposable in the natural environment in view of the global environmental problems. Especially, plastics decomposable by microorganisms are greatly expected as environmentally friend materials or functional materials of new type.

Hitherto, it has been well known that the aliphatic poly(ester carbonate) is biodegradable. Among them, an aliphatic poly(ester carbonate) prepared from an aliphatic dicarboxylic acid component mainly composed of succinic acid and an aliphatic dihydroxy compound component has been especially noticed because of their good moldability and physical properties. However, a complicated process required for producing succinic acid renders the process for producing aliphatic poly(ester carbonate) from raw materials mainly composed of succinic acid more expensive, inhibiting such a production process from being used generally in the art.

In the production of aliphatic poly(ester carbonate) by dehydration polycondensation of succinic acid and glycol, 2 mol of water are produced from 1 mol of succinic acid. The removal of water thus produced causes problems such as prolonged reaction time and increase in consumed energy. Therefore, the use of succinic anhydride as a starting material has been attempted to avoid these problems. However, since succinic acid is usually produced by the hydrogenation of maleic anhydride especially in the presence of an aqueous solvent in industrial process, it has been difficult to isolate the succinic acid in the form of anhydride.

The conventional production of aliphatic poly(ester carbonate) from maleic anhydride includes a step of hydrogenating maleic anhydride in water, a step of obtaining succinic acid by subjecting the resulting hydrogenated product to crystallization, filtration, washing and drying, and a step of polycondensing succinic acid thus obtained with glycol while distilling off a large amount of generating water. Therefore, it has been required to simplify such a quite complicated production process. The hydrogenation of maleic anhydride in water also leads to by-production of malic acid by the addition of one water molecule to one unsaturated bond of maleic anhydride. If a large amount of malic acid is by-produced, there arise problems such as gelation of resulting polymers.

DISCLOSURE OF THE INVENTION

An object of the present invention is to provide a simplified process for producing an aliphatic poly(ester carbonate) having practically satisfactory moldability and physical properties from maleic anhydride and glycol, which requires only a short reaction time and a less energy consumption. Another object of the present invention is to provide a process for producing an aliphatic poly(ester carbonate) which is less suffered from the by-production of tri- or more functional compounds by the side reaction of maleic anhydride as well as the cyclization of glycol.

As a result of extensive research in view of the above objects, the inventors have found that the hydrogenation of maleic anhydride in the presence of glycol prevents the occurrence of side reactions, eliminates the necessity of purification process conventionally required after the hydrogenation reaction, and enables a transesterification reaction simultaneous with the hydrogenation. The present invention has been accomplished on the basis of this finding.

Thus, the present invention provides a process for producing an aliphatic poly(ester carbonate) having a weight-average molecular weight of 100,000 or more, which comprises a step of reacting maleic anhydride, a $C_{2-20}$ glycol and hydrogen in the presence of a hydrogenating catalyst to produce an aliphatic oligoester; a step of polycondensing the aliphatic oligoester in the presence of a transesterification catalyst to produce an aliphatic polyester oligomer having a number-average molecular weight of 200 to 5,000; and a step of reacting the aliphatic polyester oligomer with a carbonic diester.

BEST MODE FOR CARRYING OUT THE INVENTION

The production of the aliphatic poly(ester carbonate) according to the present invention comprises a first step of simultaneously performing the hydrogenation and transesterification of maleic anhydride in the presence of glycol to produce an aliphatic oligoester; a second step of polycondensing the aliphatic oligoester to produce an aliphatic polyester oligomer; and a third step of reacting the aliphatic polyester oligomer with a carbonic diester.

1. First Step

The first step may be accomplished by either a batch method or a flow method.

In the batch method, a mixture comprising 1 to 4 mol of $C_{2-20}$ glycol per 1 mol of maleic anhydride is stirred in the presence of a hydrogenating catalyst at 60 to 250° C. under a hydrogen pressure of 1 to 100 kgf/cm$^2$ to simultaneously perform the hydrogenation and initial polymerization, thereby obtaining the aliphatic oligoester.

In the flow method, a mixture comprising 1 to 4 mol of $C_{2-20}$ glycol per 1 mol of maleic anhydride is continuously passed through a fixed bed of the hydrogenating catalyst at 60 to 250° C. under a hydrogen pressure of 1 to 100 kgf/cm$^2$ to simultaneously perform the hydrogenation and initial polymerization, thereby obtaining the aliphatic oligoester.

The first step conducted by the batch method is described in detail below.

In the batch-wise first step, a mixture of maleic anhydride and the glycol in a molar ratio of 1:1–4, preferably 1:1–2 is stirred in the presence of the hydrogenating catalyst at 60 to 250° C., preferably 80 to 170° C. under a hydrogen pressure of 1 to 100 kgf/cm$^2$, preferably 5 to 50 kgf/cm$^2$ to simultaneously perform the hydrogenation and the initial polymerization, thereby obtaining the aliphatic oligoester.

By-produced water and cyclized by-products of the glycol are removed out of the reaction system, if desired. The molecular weight of the aliphatic oligoester produced in the first step is about 100 to about 2,000 in terms of a number-average molecular weight (Mn) although varying depending upon the reaction conditions. The amount of the dehydration-cyclized by-products of glycol contained in the aliphatic oligoester is less than 10% by mol based on the charged amount of glycol. A reaction temperature exceeding 250° C. produces a large amount of tri- or more functional by-products, resulting in considerable increase of the gel content in final polymers.

The glycol is used in an amount of 1 to 4 mol per 1 mol of maleic anhydride. When the heat generation of reaction is large, the amount of glycol used may be increased. A process where maleic anhydride and glycol are pre-polycondensed and then hydrogenated in the presence of the hydrogenating catalyst is undesirable because side reactions due to cyclization of glycol are promoted.

In addition, the first step is preferably carried out in the presence of a catalyst supported on a carbon carrier, because the reaction rate of the third step is remarkably increased. When a carrier other than carbon is used, the similar effect of increasing the reaction rate of the third step is attained by separately adding carbon such as activated carbon during or after the hydrogenation reaction.

Examples of the hydrogenating catalyst used in the first step include palladium, palladium compounds, platinum, platinum compounds, ruthenium and ruthenium compounds. More specifically, mentioned are elementary palladium (palladium black), palladium-carbon, palladium-alumina, palladium-silica alumina, palladium-barium sulfate, palladium-zeolite, palladium oxide, elementary platinum (platinum black), platinum-carbon, platinum-alumina, platinum oxide, elementary ruthenium (ruthenium black), ruthenium-carbon, ruthenium-alumina, ruthenium oxide or the like.

The content of the metal catalyst component in the carrier is not particularly restricted, and preferably less than 10% by weight in view of good handling property. The amount of the catalyst added is not particularly restricted, and preferably about 0.1 to about 10% by weight based on the weight of the reactant solution (maleic anhydride+glycol).

Examples of the glycol used in the first step include $C_{2-20}$ aliphatic linear, branched, or alicyclic glycols. Examples of the glycol include ethylene glycol, propane diol, butane diol, pentane diol, hexane diol, octane diol, neopentyl glycol, cyclohexane dimethanol, tricyclodecane dimethanol, pentacyclodecane dimethanol or the like. Of these glycols, butane diol is preferred in view of biodegradability and melting point of the final aliphatic poly(ester carbonate).

In the batch-wise first step, the catalyst can be separated by a suitable method such as filtration, pressure-filtration, centrifugation and decantation without contact with moisture and outside air. The thus separated catalyst is reusable. Alternatively, the catalyst may be separated by a filter fitted to a reactor, or may be separated in a filtering vessel disposed outside the reactor. In a preferred embodiment, the catalyst cake on the filter is mixed with the reactants for the next run and recycled to the reactor. Further, the pelletized catalyst is placed in a basket provided within the reactor, this omitting the separation step such as filtration.

The flow method is preferably performed using a trickle bed reactor filled with pellets of the catalyst. When the heat generation of reaction becomes large, it is preferred to increase the amount of glycol used or dilute the catalyst with the reaction solution. In addition, the heat of reaction may be removed by a heat exchanger provided within the reactor.

2. Second Step

In the second step, the aliphatic oligoester produced in the first step is polycondensed at 100 to 280° C. in the presence of a transesterification catalyst to produce an aliphatic polyester oligomer having a number-average molecular weight of 200 to 5,000. In the second step, water or alcohol by-produced from the polycondensation reaction as well as excess glycol are removed. The polycondensation reaction is finally performed under reduced pressure. The reaction pressure is selected so as to attain the above objects. Preferably, the reaction pressure is 300 mmHg or lower in order to promote the reaction. In the second step, a different kind of glycol, a dicarboxylic acid and/or a hydroxycarboxylic acid may be added to copolymerize with the aliphatic oligoester.

The molecular weight, the acid value and the amount of residual glycol of the aliphatic polyester oligomer may be controlled by suitably balancing the distillation speed of the unreacted glycol and the transesterification rate. In addition, practically employed are to suitably select molar ratio of initial charge, kind and shape of catalyst, temperature, vacuum degree and reaction time, or to blow an inert gas at a suitable flow rate. In general, the reaction is carried out at 100 to 280° C. in the presence of the transesterification catalyst while controlling the vacuum degree stepwise. For instance, the reaction is carried out by first conducting the esterification under ordinary pressure while removing water produced by the condensation reaction, then continuing the dehydration condensation reaction at a vacuum degree of about 200 to about 80 mmHg to reduce the acid value, and finally adjusting the vacuum degree to 5 mmHg or lower.

By increasing the distillation speed of the excess glycol and the evacuating speed, the reaction time can be shortened and the amount of residual glycol in the oligomer can be reduced.

Any known transesterification catalyst may be used in the present invention. Especially preferred is a composite catalyst comprising a combination of zirconium compound or a hafnium compound with at least one compound selected from the group consisting of yttrium compounds, lanthanum compounds, zinc compounds and tin compounds. The use of such a composite catalyst prevents discoloration of the resulting aliphatic poly(ester carbonate), reduces the amount of terminal carboxylic groups and shortens the reaction time. The amount of the transesterification catalyst used is in the range of from $5 \times 10^{-5}$ to 1 part by weight based on 100 parts by weight of a mixture of the reactants. The compounds constituting the transesterification catalyst are preferably in the form of fatty acid salt, hydroxide, alcoholate, phenolate, acetylacetonate or the like.

3. Third Step

The reaction mixture containing the aliphatic polyester oligomer as obtained in the second step is usually immediately transferred to the third step without separation of the oligomer and removal of the transesterification catalyst.

In the third step, the aliphatic polyester oligomer obtained in the second step is reacted with a carbonic diester to produce an aliphatic poly(ester carbonate) having a weight-average molecular weight (Mw) of at least 100,000 as measured by a gel permeation chromatography (GPC) and calibrated using a standard polystyrene, and a melting point of 60 to 200° C. The polymerization reaction is conducted at usually 150 to 280° C., preferably 200 to 220° C. while removing the by-produced glycol or water. When the reaction temperature is less than 150° C., the reaction rate is insufficient. When the reaction temperature exceeds 280° C., the polymerization reaction rate is sufficiently high, but the resulting polymer tends to undergo undesired discoloration. The pressure of the reaction system is preferably gradually reduced to a final pressure of 3 mmHg or lower.

Examples of the carbonic diester include diphenyl carbonate, ditolyl carbonate, bis(chlorophenyl) carbonate, m-cresyl carbonate, dimethyl carbonate, diethyl carbonate, ethylene carbonate, propylene carbonate, dipropyl carbonate, dibutyl carbonate, diamyl carbonate, dihexyl carbonate, dioctyl carbonate or the like. In addition to the above carbonic diesters, there may also be used a mixed carbonic diester having different ester moieties. Of these carbonic diesters, especially preferred is diphenyl carbonate. The carbonic diester is used in an amount of 0.4 to 0.6 mol, preferably 0.45 to 0.55 mol, more preferably 0.47 to 0.52 mol per one mole of terminal hydroxyl end groups of the aliphatic polyester oligomer.

In the third step, in addition to the carbonic diester, glycol may be added to block-copolymerize with the aliphatic polyester oligomer. The glycol to be added in the third step may be the same or different from that used in the first step.

In the third step, the carbonic diester may be used in combination with a dicarboxylic acid. Examples of the dicarboxylic acid include aliphatic dicarboxylic acids such as succinic acid, oxalic acid, malonic acid, adipic acid and azelaic acid and their anhydrides, monoesters and diesters; aromatic polycarboxylic acids such as terephthalic acid, isophthalic acid, trimellitic acid and pyromellitic acid and their anhydrides, monoesters and diesters; or the like. Of these dicarboxylic acids, preferred are diesters. The amount of the dicarboxylic acid added is 0.4 to 0.6 mol, preferably 0.45 to 0.55 mol, more preferably 0.47 to 0.52 mol per one mole of terminal hydroxyl groups of the aliphatic polyester oligomer.

The aliphatic poly(ester carbonate) of the present invention is formed into moldings or shaped articles by ordinary methods such as injection molding, extrusion, inflation molding, T-die molding, spinning, filament forming, blow molding, pressure-vacuum forming and foam molding. The aliphatic poly(ester carbonate) may also contain, if necessary, known additives such as fillers, antioxidants, stabilizers, nucleating agents, ultraviolet light absorbers, lubricants, waxes, colorants and pigments.

The molecular weight of the aliphatic poly(ester carbonate) of the present invention is suitably selected depending on molding or forming conditions, kind of molded or shaped products, molding or forming temperature and the like. In the injection molding except for special cases, preferably used is an aliphatic poly(ester carbonate) having a weight-average molecular weight Mw of 120,000 to 350,000 as measured by GPC using a standard polystyrene calibration.

The aliphatic poly(ester carbonate) of the present invention has a melt viscosity of 2,000 to 50,000 P as measured by a flow tester at 190° C. under a load of 60 kgf. If the melt viscosity is lower than 2,000 P, the resin becomes excessively flowable and fails to be molded or formed stably. If the melt viscosity is higher than 50,000 P, a sufficient fluidity is not obtained to make the molding or forming difficult. Therefore, the melt viscosity of the aliphatic poly(ester carbonate) is preferably 2,000 to 30,000 P, and more preferably 5,000 to 30,000 for producing a uniform film with good quality.

The amount of tri- or more functional compounds in the aliphatic poly(ester carbonate) of the present invention is less than 3 mol % based on the maleic anhydride initially charged.

The aliphatic poly(ester carbonate) of the present invention is a highly crystalline polymer having a melting point of 70 to 200° C., and has an excellent solvent resistance, because it is not dissolved in most of alcohols, ketones, ethers, esters and aliphatic and aromatic hydrocarbons such as tetrahydrofuran, methanol, acetone, ethyl acetate, diethyl ether, hexane, toluene and xylene, although it is dissolved in chloroform and methylene chloride.

The biodegradability of the aliphatic poly(ester carbonate) varies depending on the molecular weight and the content of carbonate unit. When a film is subjected to a biodegradation test in soil at 25° C. and 60% RH, the aliphatic poly(ester carbonate) having a carbonate unit content of at least 5 mol % shows a higher degradability despite its high molecular weight as compared with aliphatic polyesters having no carbonate unit. More than half of the polymer is degraded in 18 weeks when the carbonate unit content in the polymer is 7.0 mol % or more, and the polymer is completely degraded in 15 weeks when the carbonate unit content is 20.0 mol % or more. Thus, the aliphatic poly(ester carbonate) shows a degradability 5 times or more higher than that of aliphatic polyesters having no carbonate unit.

As described above, according to the present invention, an aliphatic poly(ester carbonate) having a good heat resistance and solvent resistance as well as a high molecular weight sufficient for practical use can be produced. Moreover, according to the inventors' finding, the biodegradability of the aliphatic poly(ester carbonate) is enhanced with increasing carbonate unit content, and therefore, the biodegradation speed in environment, for example, in soil, can be suitably controlled by selecting the carbonate unit content.

The present invention will be described in more detail by the following Examples. 1,4-Butane diol was used as the glycol, and diphenyl carbonate was used as the carbonic diester. In the following example and comparative examples, the weight-average molecular weight (Mw) and the number-average molecular weight (Mn) were measured by GPC (GPC System-11 manufactured by Showa Denko Co., Ltd.) using chloroform as a solvent, and calibrated by standard polystyrene.

The content of residual unsaturated bonds was measured by NMR (NMR EX-270 manufactured by Japan Electron Co., Ltd.).

The melt flow rate of the aliphatic poly(ester carbonate) was measured at 190° C. under a load of 2.16 kgf using a melt indexer manufactured by Toyo Seiki Co., Ltd.

The content of tri- or more functional compounds was determined from a calibration curve which was prepared from the relationship between the molecular weights and the melt flow rates of aliphatic poly(ester carbonate) previously prepared by varying the addition amount of trimethylol propane.

The hydroxyl value and the acid value of the aliphatic polyester oligomer were measured according to JIS K-1557. From the measured hydroxyl value, the concentration of terminal hydroxyl group per unit weight of the aliphatic polyester oligomer was calculated, and ½ thereof was regarded as a stoichiometric amount of the carbonic diester and/or dicarboxylic acid compound.

EXAMPLE 1

First Step

A pressure reactor equipped with a stirrer and a pressure gauge was charged with 39.2 g (0.4 mol) of maleic anhydride, 54.1 g (0.6 mol) of 1,4-butane diol and 0.4 g of a 5% palladium/carbon catalyst. The reactor was purged with hydrogen at 50 kgf/cm² three times. After reducing the pressure to 50 kgf/cm², the temperature was raised with stirring, and the reaction was carried out at 130° C. under a pressure of 20 to 50 kgf/cm² for 2.5 h.

After the pressure reduction no longer occurred, the reaction solution was filtered under pressure to obtain 90 g of an aliphatic oligoester. The resulting white aliphatic oligoester had a number-average molecular weight of 600, and the NMR measurement showed that no unsaturated bonds remained therein. Further, it was confirmed that tetrahydrofuran (THF) by-produced by cyclization of 1,4-butane diol was present in an amount of 2 mol % based on 1,4-butane diol initially charged. The reaction and filtration procedures required 3 h. The yield of the aliphatic oligoester was 98%, although slightly lost by the adsorption to catalyst.

Second Step

Then, 90 g of the aliphatic oligoester obtained in the first step was charged into a 300-ml reactor equipped with a stirrer, a fractionating condenser and a thermometer, and 10 mg of zinc acetate and 5 mg of zirconium acetylacetonate as the transesterification catalyst were added thereto. The temperature was raised by heating with stirring from 100° C. to 225° C. over 45 min, and held constant at 225° C. After keeping the reaction pressure at ordinary pressure for one hour and then at 150 mmHg for one hour, the pressure was reduced to 5 mmHg over one hour. After keeping at 5 mmHg for 15 min, the reaction was stopped to obtain 65 g of an aliphatic polyester oligomer. It was confirmed that the resulting aliphatic polyester oligomer had a number-average molecular weight of 3,600, a terminal hydroxyl value of 75.1 KOHmg/g, and the reaction time was 4 h.

Third Step

Then, 25.1 g of the aliphatic polyester oligomer obtained in the second step was charged into a 100-ml reactor equipped with a stirrer, a fractionating condenser and a thermometer, and 3.73 g of diphenyl carbonate (DPC) was added thereto. The resulting mixture was heated with stirring under reduced pressure.

While keeping the reaction temperature constant (at 225° C.), the reaction pressure was held at 150 mmHg for 30 min, and then at 100 mmHg for one hour and 20 min. Thereafter, the reaction pressure was reduced to full vacuum (1 mmHg or lower) over one hour, and the reaction was continued under full vacuum for 30 min to obtain an aliphatic poly (ester carbonate) having a weight-average molecular weight (Mw) of 250,000. The amount of trifunctional components in the aliphatic poly(ester carbonate) was 0.4 mol % based on maleic anhydride initially charged. The reaction time required for the third step was 3 h and 20 min, and the overall reaction time for the first through third steps was 10 h and 20 min.

COMPARATIVE EXAMPLE 1

Production of Succinic Acid

A pressure reactor equipped with a stirrer and a pressure gauge was charged with 39.2 g (0.4 mol) of maleic anhydride, 60 g of water and 0.4 g of a 5% palladium/carbon catalyst. The reactor was purged with hydrogen at 50 kgf/cm² three times. After reducing the pressure to 40 kgf/cm², the temperature was raised by heating with stirring, and the reaction was carried out at 130° C. under a pressure of 20 to 50 kgf/cm² for 2.5 h.

After the pressure reduction no longer occurred, the reaction solution still hot was filtered under pressure, and the filtrate was allowed to stand for cooling for 3 h. Thereafter, the precipitated white crystal was removed by filtration and dried in a vacuum dryer for 5 h to obtain 37.7 g of succinic acid at a yield of 80% based on maleic anhydride. The total time required for the reaction, crystallization, filtration and drying was 12 h.

Production of Aliphatic Polyester Oligomer

Then, 37.48 g (0.32 mol) of succinic acid thus obtained, 42.86 g (0.48 mol) of 1,4-butane diol, 4 mg of zirconium acetylacetonate and 8 mg of zinc acetate were charged into a 300-ml reactor equipped with a stirrer, a fractionating condenser, a thermometer and a gas inlet tube. The reaction was carried out under a nitrogen atmosphere at 150 to 220° C. for 2 h while distilling off water. Successively, the pressure was held at 150 to 80 mmHg for 2 h to proceed the condensation reaction. Then, while gradually reducing the reaction pressure so as to finally reach 5 mmHg or lower, water and 1,4-butane diol were distilled off to obtain an aliphatic polyester oligomer having a number-average molecular weight of 1,020 and a terminal hydroxyl value of 76 KOHmg/g. The reaction time was 5 h and 30 min.

Production of Aliphatic Poly(Ester Carbonate)

Then, 25 g of the thus obtained aliphatic polyester oligomer was charged into a 100-ml reactor equipped with a stirrer, a fractionating condenser, a thermometer and a gas inlet tube, and 3.71 g of diphenyl carbonate was added thereto. The reaction system was kept for 2.5 h under full vacuum which was attained in the same manner as in the third step of Example 1 to obtain an aliphatic poly(ester carbonate) having a weight-average molecular weight of 240,000. The amount of trifunctional components in the aliphatic poly(ester carbonate) was 0.2 mol % based on maleic anhydride initially charged. The time required for the above step was 5 h, and the total reaction time from the production of succinic acid to the above step was 22.5 h.

COMPARATIVE EXAMPLE 2

Pre-oligomerization Reaction of Maleic Anhydride and Glycol

A 200-ml reactor equipped with a stirrer, a fractionating condenser and a thermometer was charged with 39.2 g (0.4 mol) of maleic anhydride and 54.1 g (0.6 mol) of 1,4-butane diol. The reactor was purged with nitrogen three times. The temperature was gradually raised from 150° C. to a final temperature of 220° C. to proceed the ring opening reaction and condensation reaction of maleic anhydride to obtain an unsaturated aliphatic polyester oligomer. It was confirmed that the resulting oligomer had a weight-average molecular weight of 780, and contained THF by-produced from 1,4-butane diol in an amount of 25 mol % based on 1,4-butane diol initially charged.

Into a pressure vessel, was charged 40 g of the thus obtained unsaturated aliphatic polyester oligomer. The hydrogenation ration was carried out at 20 to 50 kgf/cm² in the presence of 0.2 g of a palladium/carbon catalyst to obtain an aliphatic polyester oligomer.

INDUSTRIAL APPLICABILITY

In accordance with the production process of the present invention, a useful aliphatic poly(ester carbonate) is produced by a simplified method at a high yield in a short period of time. The resulting aliphatic poly(ester carbonate) shows practically satisfactory moldability and physical properties and is suitable for production of various moldings and shaped articles such as injection-molded products, films, sheets, bottles, foamed products and fibers. The moldings and shaped articles are excellent in heat resistance, solvent resistance and mechanical strength, and show a high biodegradability in soil or activated sludge process.

What is claimed is:

1. A process for producing an aliphatic poly(ester carbonate) having a weight-average molecular weight of 100,000 or more, which comprises:
   a step of reacting maleic anhydride, a $C_{2-20}$ glycol and hydrogen in the presence of a hydrogenating catalyst to produce an aliphatic oligoester;
   a step of polycondensing the aliphatic oligoester in the presence of a transesterification catalyst to produce an aliphatic polyester oligomer having a number-average molecular weight of 200 to 5,000; and
   a step of reacting the aliphatic polyester oligomer with a carbonic diester.

2. The process according to claim 1, wherein the amount of tri- or more functional compounds in the aliphatic poly(ester carbonate) is less than 3 mol % based on the maleic anhydride initially charged.

3. The process according to claim 2, wherein the amount of by-products due to cyclization of the glycol, which is contained in the aliphatic oligoester, is less than 10 mol % based on the glycol initially charged.

4. The process according to claim 3, wherein the hydrogenating catalyst is at least one member selected from the group consisting of palladium, palladium compounds, platinum, platinum compounds, ruthenium and ruthenium compounds.

5. The process according to claim 4, wherein the transesterification catalyst comprises a combination of a zirconium compound or a hafnium compound with at least one compound selected from the group consisting of yttrium compounds, lanthanum compounds, zinc compounds and tin compounds.

6. The process according to claim 5, wherein the glycol is used in an amount of 1 to 4 mol per 1 mol of maleic anhydride.

7. The process according to claim 6, wherein the reaction of maleic anhydride, the $C_{2-20}$ glycol and hydrogen is carried out under a hydrogen pressure of 1 to 100 kgf/cm$^2$.

8. The process according to claim 7, wherein the reaction of maleic anhydride, the $C_{2-20}$ glycol and hydrogen is carried out at 60 to 250° C.

9. The process according to claim 8, wherein the hydrogenating catalyst is used in an amount of 0.1 to 10% by weight based on a total weight of maleic anhydride and the glycol.

10. The process according to claim 9, wherein the hydrogenating catalyst is at least one member selected from the group consisting of palladium, palladium compounds, platinum, platinum compounds, ruthenium and ruthenium compounds.

11. The process according to claim 10, wherein the glycol is at least one aliphatic glycol selected from the group consisting of ethylene glycol, propane diol, butane diol, pentane diol, hexane diol, octane diol, neopentyl glycol, cyclohexane dimethanol, tricyclodecane dimethanol and pentacyclodecane dimethanol.

12. The process according to claim 1, wherein the amount of by-products due to cyclization of the glycol, which is contained in the aliphatic oligoester, is less than 10 mol % based on the glycol initially charged.

13. The process according to claim 1, wherein the hydrogenating catalyst is at least one member selected from the group consisting of palladium, palladium compounds, platinum, platinum compounds, ruthenium and ruthenium compounds.

14. The process according to claim 1, wherein the transesterification catalyst comprises a combination of a zirconium compound or a hafnium compound with at least one compound selected from the group consisting of yttrium compounds, lanthanum compounds, zinc compounds and tin compounds.

15. The process according to claim 1, wherein the glycol is used in an amount of 1 to 4 mol per 1 mol of maleic anhydride.

16. The process according to claim 1, wherein the reaction of maleic anhydride, the $C_{2-20}$ glycol and hydrogen is carried out under a hydrogen pressure of 1 to 100 kgf/cm$^2$.

17. The process according to claim 1, wherein the reaction of maleic anhydride, the $C_{2-20}$ glycol and hydrogen is carried out at 60 to 250° C.

18. The process according to claim 1, wherein the hydrogenating catalyst is used in an amount of 0.1 to 10% by weight based on a total weight of maleic anhydride and the glycol.

19. The process according to claim 1, wherein the hydrogenating catalyst is at least one member selected from the group consisting of palladium, palladium compounds, platinum, platinum compounds, ruthenium and ruthenium compounds.

20. The process according to claim 1, wherein the glycol is at least one aliphatic glycol selected from the group consisting of ethylene glycol, propane diol, butane diol, pentane diol, hexane diol, octane diol, neopentyl glycol, cyclohexane dimethanol, tricyclodecane dimethanol and pentacyclodecane dimethanol.

* * * * *